(12) United States Patent
Park et al.

(10) Patent No.: US 12,411,094 B2
(45) Date of Patent: Sep. 9, 2025

(54) FOREIGN SUBSTANCE DETECTION DEVICE AND DETECTION METHOD

(71) Applicant: LG Energy Solution, Ltd., Seoul (KR)

(72) Inventors: Jeong Ho Park, Daejeon (KR); Eun Ho Oh, Daejeon (KR); Tae Su Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 203 days.

(21) Appl. No.: 18/017,485

(22) PCT Filed: Jul. 30, 2021

(86) PCT No.: PCT/KR2021/009964
§ 371 (c)(1),
(2) Date: Jan. 23, 2023

(87) PCT Pub. No.: WO2022/025699
PCT Pub. Date: Feb. 3, 2022

(65) Prior Publication Data
US 2023/0358688 A1    Nov. 9, 2023

(30) Foreign Application Priority Data

Jul. 31, 2020  (KR) .................. 10-2020-0095886

(51) Int. Cl.
*G01N 21/88* (2006.01)
*G01N 21/3581* (2014.01)
(Continued)

(52) U.S. Cl.
CPC ..... *G01N 21/8851* (2013.01); *G01N 21/3581* (2013.01); *G01N 21/8806* (2013.01);
(Continued)

(58) Field of Classification Search
CPC ... G01N 2021/8809; G01N 2021/8848; G01N 2021/8861; G01N 2021/8874;
(Continued)

(56) References Cited

U.S. PATENT DOCUMENTS

2001/0054693 A1  12/2001  Chou et al.
2006/0086912 A1   4/2006  Weir et al.
(Continued)

FOREIGN PATENT DOCUMENTS

CN  103348235 A  10/2013
CN  206004622 U   3/2017
(Continued)

OTHER PUBLICATIONS

Extended European Search Report including Written Opinion for Application No. 21848808.8 dated Sep. 15, 2023, pp. 1-10.
(Continued)

*Primary Examiner* — Peter B Kim
(74) *Attorney, Agent, or Firm* — Lerner David LLP (57) ABSTRACT

A debris detection apparatus and a debris detection method, capable of easily detecting a metal debris existing on the surface of an inspection target by emitting electromagnetic waves having a wavelength in a far-infrared band toward the inspection target during a battery manufacturing process and then analyzing the characteristics of reflected waves from the surface of the inspection target through a thermal image recorder.

9 Claims, 5 Drawing Sheets

(51) Int. Cl.
    *G01N 21/94*     (2006.01)
    *H01M 10/42*     (2006.01)

(52) U.S. Cl.
    CPC ........ *G01N 21/94* (2013.01); *H01M 10/4285* (2013.01); *G01N 2021/8848* (2013.01); *G01N 2021/8861* (2013.01); *G01N 2021/8874* (2013.01)

(58) Field of Classification Search
    CPC ... G01N 2021/8806; G01N 2021/8851; G01N 2021/8887; G01N 2021/8918; G01N 2021/3581; G01N 2021/94; H01M 10/00; H01M 10/4285; H01M 10/48; G01J 5/60; Y02E 60/10
    See application file for complete search history.

(56) References Cited

U.S. PATENT DOCUMENTS

| | | |
|---|---|---|
| 2011/0090507 A1 | 4/2011 | Park et al. |
| 2013/0320216 A1 | 12/2013 | Aiko et al. |
| 2018/0361571 A1* | 12/2018 | Georgeson ............... B25J 9/109 |
| 2021/0304398 A1* | 9/2021 | Safai ..................... G06T 7/0004 |

FOREIGN PATENT DOCUMENTS

| | | | | |
|---|---|---|---|---|
| CN | 107931802 A | | 4/2018 | |
| CN | 112881427 A | * | 6/2021 | ......... G01N 21/8851 |
| JP | 2000065759 A | | 3/2000 | |
| JP | 2008153119 A | | 7/2008 | |
| JP | 4159952 B2 | | 10/2008 | |
| JP | 2018010770 A | | 1/2018 | |
| JP | 2020101392 A | | 7/2020 | |
| KR | 20100039962 A | | 4/2010 | |
| KR | 20110029011 A | | 3/2011 | |
| KR | 20130035827 A | | 4/2013 | |
| KR | 20150004146 A | | 1/2015 | |
| KR | 101940449 B1 | | 1/2019 | |
| KR | 102000698 B1 | | 10/2019 | |

OTHER PUBLICATIONS

International Search Report for Application No. PCT/KR2021/009964 mailed Nov. 23, 2021, pp. 1-3.

* cited by examiner

- CONTAMINATION IN THE FORM OF PARTICLE
  (SINGLE PARTICLE WITH DIAMETER OF 20㎛ OR MORE)

- CONTAMINATION IN THE FORM OF FIBER
  (PARTICLE SMALLER THAN 10 ㎛ IS GATHERED ALONG FIBER)

FIG. 5

FOREIGN SUBSTANCE DETECTION DEVICE AND DETECTION METHOD

CROSS-REFERENCE TO RELATED APPLICATIONS

The present application is a national phase entry under 35 U.S.C. § 371 of International Application No. PCT/KR2021/009964 filed Jul. 30, 2021, which claims priority from Korean Patent Application No. 10-2020-0095886 filed Jul. 31, 2020, all of which are incorporated herein by reference.

TECHNICAL FIELD

The present disclosure relates to a debris detection apparatus and a debris detection method, capable of easily detecting a metal debris existing on the surface of an inspection target during a battery manufacturing process.

BACKGROUND ART

In general, during a battery manufacturing process, a metal debris may occur in outer mold processing (swaging, beading, and the like). The metal debris may cause an electrical short, resulting in a battery failure. Such a metal debris needs to be removed in advance through a process such as vision inspection.

However, when the diameter of the metal debris is 100 μm or less, it is difficult to specify the metal debris unless a microscope having a large magnification is used. In addition, it may be difficult to distinguish the metal debris from simple non-metallic dust.

An apparatus for detecting a debris during a battery manufacturing process as described above is disclosed in Korean Patent Application Publication No. 10-2011-0029011 (published on Mar. 22, 2011) and the like.

The debris detection apparatus in the related art determines whether a debris exists in a battery (hereinafter, referred to as an "inspection target") by applying a light scattering method to the surface of a battery case.

Specifically, the debris detection apparatus in the related art detects a debris by irradiating the inspection target with straight light at a preset incident angle and, when the reflection angle of reflected light is different from the incident angle, considering this as diffused reflection due to the debris. Such a method has an advantage in that a sensor is installed at a predetermined angle, which simples the structure of the debris detection apparatus.

However, according to the debris detection apparatus in the related art, when the surface of the inspection target is rough or curved, light may be diffusely reflected at an angle different from the incident angle, which may cause a mistake for a debris.

SUMMARY

Technical Problem

Embodiments of the present disclosure intend to provide a debris detection apparatus and a debris detection method, capable of easily detecting a metal debris existing on the surface of an inspection target by emitting electromagnetic waves having a wavelength in a far-infrared band toward the inspection target during a battery manufacturing process and then analyzing the characteristics of reflected waves from the surface of the inspection target through a thermal image recorder.

Technical Solution

In order to implement the object described above, a debris detection apparatus according to the present disclosure may include: an infrared emitter configured to emit infrared rays toward an inspection target; one of: (i) an optical amplifier configured to either amplify an infrared signal reflected from a metal debris existing on a surface of the inspection target, or (ii) and optical filter configured to filter the infrared signal; and a thermal image recorder configured to detect the metal debris on the surface of the inspection target and determine a size and a position of the metal debris, based on the amplified or filtered infrared signal.

In such a case, the infrared emitter may be configured to emit electromagnetic waves having low energy in a far-infrared band between 7 μm to 14 μm.

Furthermore, the infrared emitter may be disposed above the inspection target on a central axial line while being spaced apart from the inspection target, and the optical amplifier or optical filter and the thermal image recorder may be sequentially disposed above the infrared emitter on the central axial line while being spaced apart from the infrared emitter.

Furthermore, the infrared emitter may further include a through hole formed along the central axial line, and the through hole may be positioned to permit the infrared signal reflected from the surface of the inspection target to reach the optical unit through the through hole.

Furthermore, a diameter of the through hole may be equal to or larger than a diameter of the inspection target.

Furthermore, the optical amplifier or optical filter may include any one of a polarizing plate, a waveplate, or a band pass filter.

Furthermore, the thermal image recorder may include a lens and a focal plane array (FPA) including a sensor array for detecting the infrared signal, and may be configured to record a spatial position of the infrared signal.

Furthermore, a debris detection method may include: emitting, by an infrared emitter, far-infrared rays in a band of 7 μm to 14 μm toward an inspection target; either one of: (i) amplifying, by an optical unit, an infrared signal reflected from a metal debris existing on a surface of the inspection target, or (ii) filtering, by an optical filter, the infrared signal; detecting, by a thermal image recorder, the metal debris on the surface of the inspection target; and determining, by the thermal image recorder, a size and a position of the metal debris, based on the amplified or filtered infrared signal.

Advantageous Effects

A debris detection apparatus according to the present disclosure having the above configuration can specify a metal debris existing on the surface of an inspection target and the size and position of the metal debris by emitting electromagnetic waves in a far-infrared band toward the inspection target and then analyzing the characteristics of reflected waves from the surface of the inspection target through a thermal image recorder.

In such a case, an infrared emitting unit uses light reflected when a metal debris is detected, and thus low power that hardly raises the temperature of the inspection target when a light source for emitting far infrared rays is selected.

Furthermore, as a light source with low power is used, a signal due to the metal debris may be generated, but the temperature around the inspection target does not rise, which may increase the resolution of metal debris detection.

The corresponding technology is, unlike one of recognizing metal particles through reflective imaging caused by scattering of fine particles in the visible light region used by the existing vision optical system, a method of increasing the resolution by using the characteristics that metal has high reflectivity in a long wavelength region compared to a short wavelength region in the form of detecting and imaging reflected light by metal particles by applying a minute light source (heat source) in the infrared region of long wavelengths. It is possible to separate other foreign substances such as dust or mote of organic/inorganic components with insulating properties having a fine particle diameter similar to foreign metal particles, which are difficult to distinguish in the existing vision method, and it is possible to secure resolution capable of discriminating and detecting metal particles present on the upper portion of the substrate having a roughness causing diffuse reflection or scattering in the visible light region through imaging of the infrared region described in the present invention.

The corresponding technology is, unlike the existing method of distinguishing objects with different emissivity values through temperature rise through heating by applying a certain amount of energy to a target, a method of selectively detecting reflected light using high reflection properties of metal by allowing a light source in a minute infrared region to be incident.

| Description of reference numerals | |
|---|---|
| 10: an inspection target | 11: a battery can |
| 13: a cell | 15: an insulator |
| P: metal debris | 100: a debris detection apparatus |
| 110: an infrared emitting unit | 111: a through hole |
| 120: an optical unit | 130: a thermal image recorders |

DETAILED DESCRIPTION

Hereinafter, the configuration and operation of a specific embodiment of the present disclosure will be described in detail with reference to the accompanying drawings.

It is noted that in assigning reference numerals to components in the drawings, the same reference numerals denote the same components throughout the drawings even in cases where the components are shown in different drawings.

Figure 1:
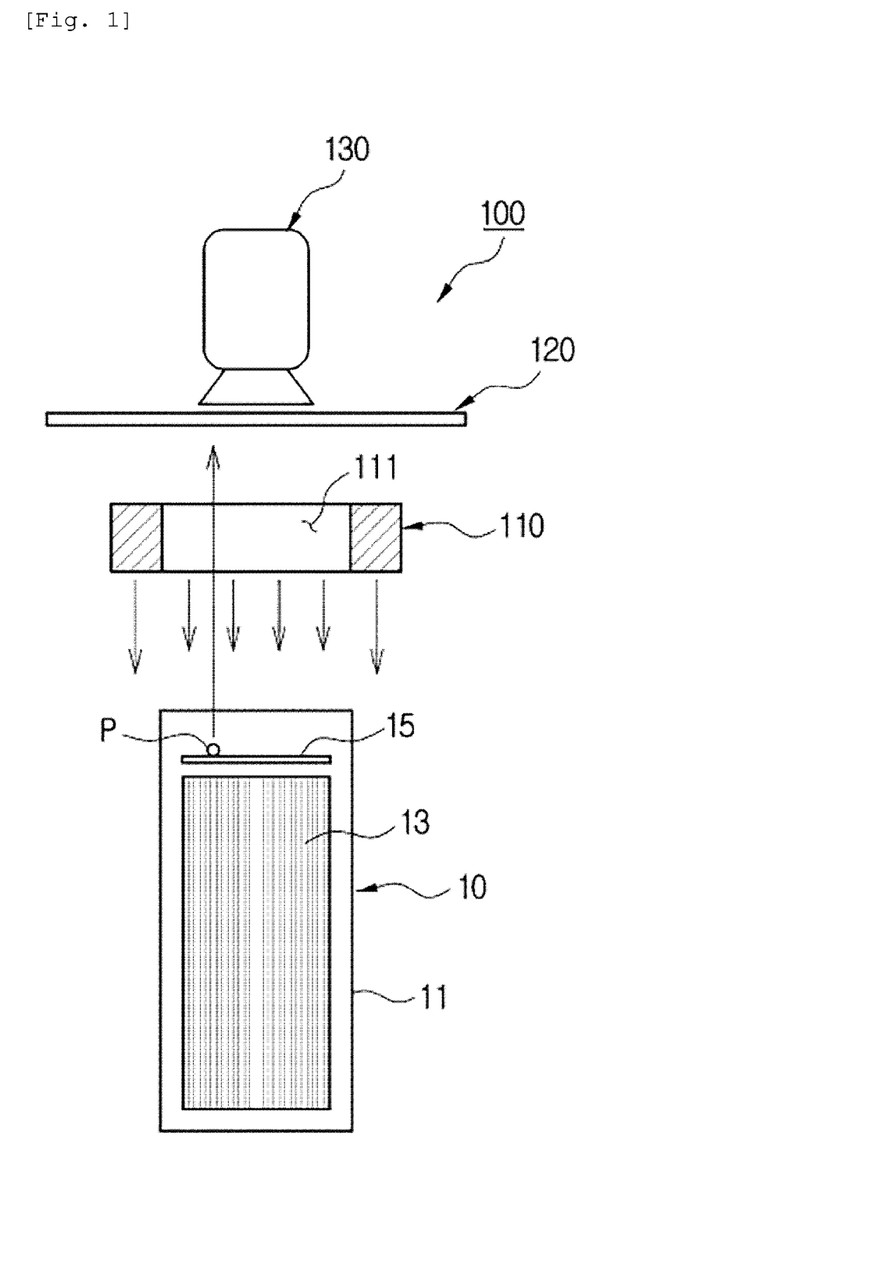
FIG. 1 is a schematic side view illustrating a debris detection apparatus according to the present disclosure.

FIG. 1 is a schematic side view illustrating a debris detection apparatus 100 according to the present disclosure.

Referring to FIG. 1, the debris detection apparatus 100 according to a preferred embodiment of the present disclosure may include an infrared emitting unit 110, an optical unit 120, and a thermal image recorder 130.

The configuration of the present disclosure will be described in detail as follows.

First, an inspection target 10 may include a cylindrical battery can 11 constituting the exterior of a battery, a cell 13 that is accommodated inside the battery can 11 and rolled in a jelly-roll shape, and a non-woven fabric insulator 15 that is laminated on an upper surface of the cell 13 to prevent a short circuit caused by a metal debris P. Hereinafter, in the present disclosure, an example of a case of inspecting whether the metal debris P exists on an upper surface of the insulator 15 of the inspection target 10 by using the debris detection apparatus 100 will be described. Of course, the present disclosure is not limited thereto.

The infrared emitting unit 110 may emit infrared rays toward the inspection target 10. The infrared emitting unit 110 may be configured as an emitter having appropriate energy enough to hardly heat the surface of the inspection target 10.

Specifically, the infrared emitting unit 110 may emit electromagnetic waves having low energy in a far-infrared band of 7 μm to 14 μm enough to cause infrared reflection from the metal debris P existing on the surface of the inspection target 10.

The far-infrared rays emitted from the infrared emitting unit 110 are electromagnetic waves emitted by a general object at room temperature, and can easily implement the infrared emitting unit 110 without a special light source.

That is, the metal debris P has high far-infrared reflection characteristics. Accordingly, an infrared signal reflected by the metal debris P may be prominently displayed through the thermal image recorder 130, which will be described below, only by a heating source (infrared emitting unit) having about a low temperature (approximately 36.5° C.) and generated in a human hand.

In other words, the far-infrared rays (7 μm to 14 μm) emitted from the infrared emitting unit 110 can maximize an infrared reflection signal from the metal debris P without significantly increasing the temperature of the inspection target 10. Accordingly, the thermal image recorder 130 may have a resolution enough to accurately specify even a metal debris P having a size of several tens of μm.

When the temperature of the surface of the inspection target 10 is excessively increased by the infrared rays emitted from the infrared emitting unit 110, the temperature of the surface of the inspection target 10 is increased, and thus infrared rays are emitted from the inspection target 10 itself. In such a case, the infrared rays emitted from the inspection target 10 itself may be difficult to distinguish from an infrared signal reflected from the metal debris P because they are mixed with each other. Accordingly, it is preferable to use, as the infrared emitting unit 110, an infrared emitter with appropriate energy (for example, a human hand, an organic material with an appropriate temperature and an infrared emissivity, a polymer, and the like).

The infrared emitting unit 110 described above may be disposed above the inspection target 10 on the central axial line while being spaced apart from the inspection target 10. In addition, the optical unit 120 and the thermal image recorder 130 may be sequentially disposed above the infrared emitting unit 110 on the same central axial line while being spaced apart from the infrared emitting unit 110.

In such a case, the infrared emitting unit 110 may have a through hole 111 formed along the vertical central axial line. The through hole 111 may allow an infrared signal reflected from the surface of the inspection target 10 to easily reach the optical unit 120 and the thermal image recorder 130 to be described below through the through hole of the infrared emitting unit 110. Preferably, the through hole 111 may be formed to be equal to or larger than a diameter of the inspection target 10.

The optical unit 120 may amplify the infrared signal reflected from the metal debris P existing on the surface of the inspection target 10 through an optical effect, or filter the infrared signal to obtain a desired signal. As such an optical unit 120, a polarizing plate, a waveplate, a band pass filter, and the like may be selectively applied.

The thermal image recorder 130 may detect whether the metal debris P exists on the surface of the inspection target 10, through the infrared signal amplified through the optical unit 120.

In such a case, the thermal image recorder 130 may include a thermal imaging camera, a computer, and the like. In addition, the thermal image recorder 130 may include a close-up lens to increase detection power by enlarging an image on the thermal image recorder 130.

Such a thermal image recorder 130 may not only determine whether the metal debris P exists on the inspection target 10, but also detect a size and a position of the metal debris P, through an array sensor (not illustrated) of the thermal imaging camera.

That is, the thermal image recorder 130 may include a lens and a focal plane array (FPA) including a sensor array for detecting an infrared signal, thereby accurately recording a spatial position of the infrared signal.

Particularly, the array sensor of the thermal image recorder 130 is disposed on the same central axial line as the infrared emitting unit 110 at the same angle. That is, since the present disclosure does not use a method for comparing an incident angle and a reflection angle, it may not be affected by the curvature or surface roughness of the surface of the inspection target 10.

Then, a debris detection method using the debris detection apparatus 100 according to the present disclosure having the above configuration will be described.

Figure 2:
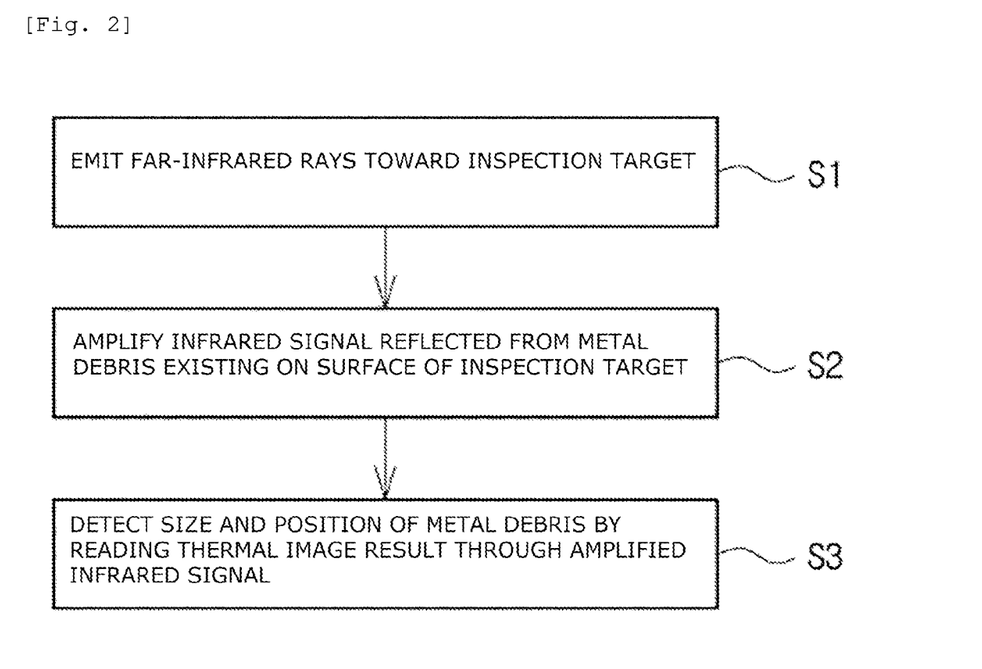
FIG. 2 is a flowchart illustrating a debris detection process using the debris detection apparatus according to the present disclosure.

Referring to FIG. 2, the infrared emitting unit 110 emits far-infrared rays in a band of 7 μm to 14 μm toward the inspection target 10 (S1). In such a case, the infrared emitting unit 110 may maximize a reflection signal from the metal debris P existing on the surface of the inspection target 10 without significantly increasing the temperature of the inspection target 10.

An infrared signal reflected from the metal debris P may be amplified or may be filtered to obtain a desired signal (S2) through the optical unit 120 (S2).

Then, the thermal image recorder 130 may record a spatial position through the infrared signal passing through the optical unit 120, and detect whether the metal debris P exists on the surface of the inspection target 10, and the size, position, and the like of the metal debris P (S3).

Figure 3:
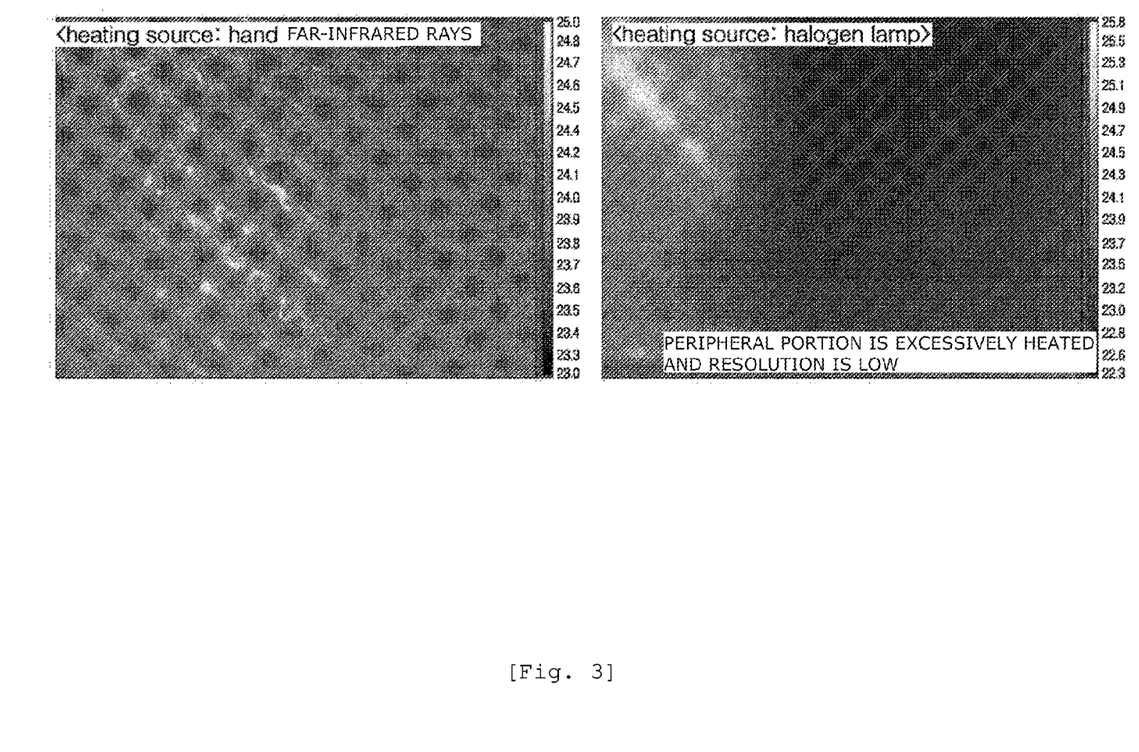
FIG. 3 and FIG. 4 are experimental result data obtained by comparing the performance of the debris detection apparatus according to the present disclosure.

Referring to FIG. 3, after the metal debris P is simulated on the upper surface of the insulator 15 in the inspection target 10 by using aluminum powder (<100 μm), the case (a) where the infrared emitting unit 110 of the present disclosure is applied and the case (b) where a halogen lamp (right) as a heating source to be compared is applied were implemented and compared and observed through the thermal image recorder 130.

As a consequence, as illustrated in FIG. 3, it could be seen that the case (a) where the infrared emitting unit 110 of the present disclosure is applied could increase the detection resolution of the metal debris P by detecting only a reflection signal from the metal debris P without heating the peripheral portion of the inspection target 10.

Figure 4:
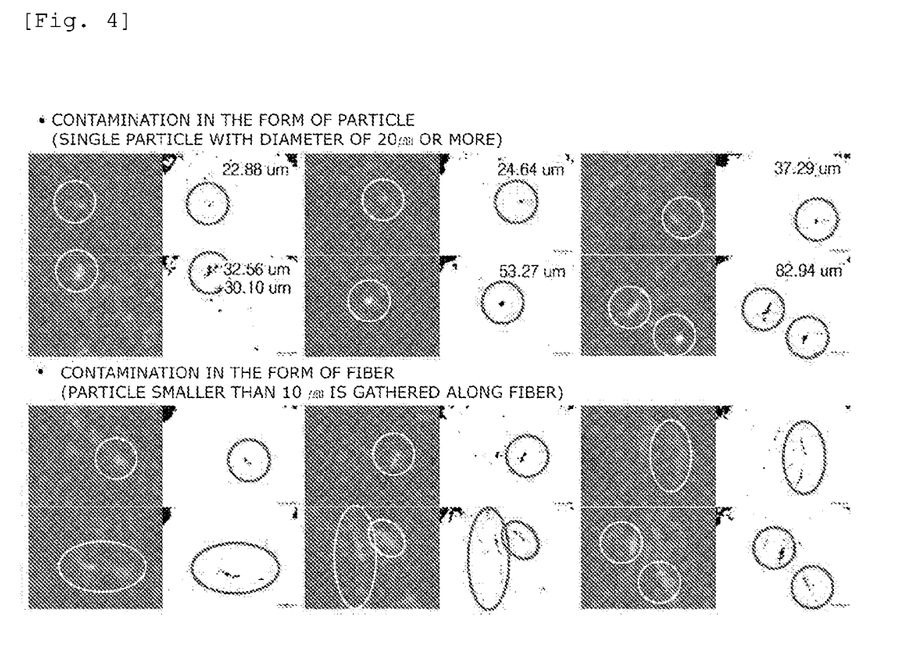

Furthermore, as illustrated in FIG. 4, the measurement result (gray image portion) of the thermal image recorder 130 and the measurement result (black and white image portion) of an optical microscope (×100) were compared with each other. In such a case, a human hand was used as a heating source, and contamination in the form of a particle (single particle with a diameter of 20 μm or more) and contamination in the form of a fiber (particle smaller than 10 μm is gathered in a fiber) were compared.

In such a case, the position of a metal debris P on the fiber was actually observed by the optical microscope, and the measurement result of the thermal image recorder 130 indicates the state in which a thermal image signal was actually captured at the position of the metal debris P confirmed by the optical microscope.

As a consequence, it could be seen that the case of the thermal image recorder 130 according to the present disclosure could increase the detection resolution of contamination.

Figure 5:
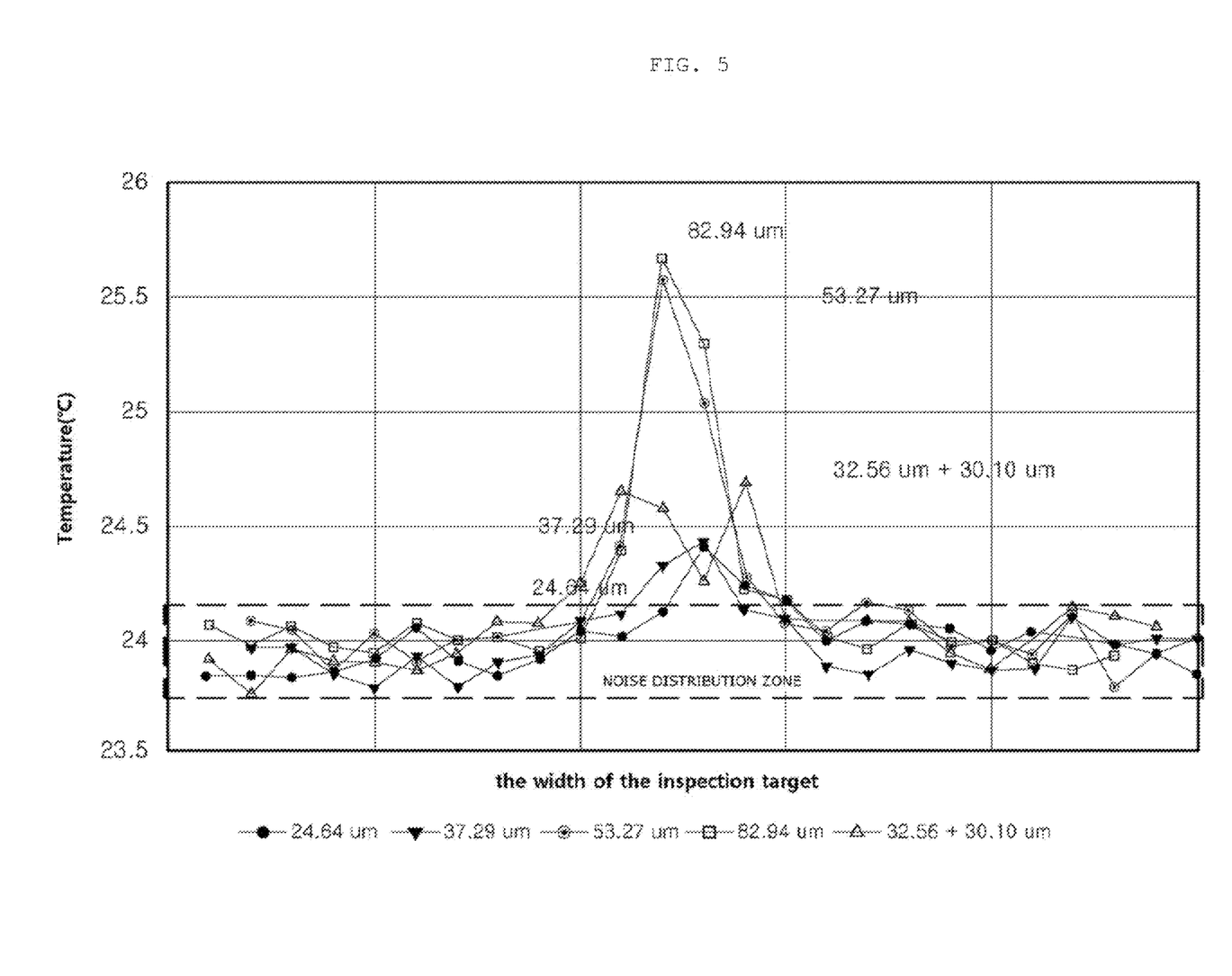
FIG. 5 is a graph illustrating a difference in thermal image signal sensitivity according to the size of a metal debris detected by the debris detection apparatus according to the present disclosure.

Furthermore, as illustrated in FIG. 5, which plots temperature of the thermal image signal (y axis) against the width of the inspection target, a difference in thermal image signal sensitivity according to the size of a metal debris P was inspected. In such a case, a human hand was used as a heating source.

As a consequence, it can be seen that a metal debris P having a size of 24.64 μm has a size close to the thermal imaging camera resolution limit of the thermal image recorder 130 and is not clearly distinguished from noise.

That is, when the size of a metal debris P is at least 30 μm or more, it may be distinguished from noise. Furthermore, since an infrared signal itself is small, it is judged that there is a difference in resolution only when a close-up lens is used.

In such a case, when a thermal imaging camera constituting the thermal image recorder 130 has a high resolution, the measurable size of a metal debris P may be smaller than 30 μm.

Although the present disclosure has been illustrated and described with reference to specific embodiments, the present disclosure is not limited to the above embodiments and various modifications and corrections can be made without departing from the technical spirit of the present disclosure.

The invention claimed is:

1. A debris detection apparatus comprising:
an infrared emitter configured to emit infrared rays toward an inspection target at a preset incident angle, wherein the infrared emitter is disposed above the inspection target on a central axial line while being spaced apart from the inspection target;
one of: (i) an optical amplifier configured to either amplify an infrared signal reflected from a metal debris existing on a surface of the inspection target, or (ii) an optical filter configured to filter the infrared signal; and
a thermal image recorder configured to detect the metal debris on the surface of the inspection target and determine a size and a position of the metal debris, based on the amplified or filtered infrared signal, wherein the optical amplifier or optical filter and the thermal image recorder are sequentially disposed above the infrared emitter on the central axial line while being spaced apart from the infrared emitter.

2. The debris detection apparatus according to claim 1, wherein the infrared emitter is configured to emit electromagnetic waves having low energy in a far-infrared band between 7 μm to 14 μm.

3. The debris detection apparatus according to claim 1, wherein the infrared emitter further includes a through hole formed along the central axial line, and
   the through hole is positioned to permit the infrared signal reflected from the surface of the inspection target to reach the optical amplifier or optical filter through the through hole.

4. The debris detection apparatus according to claim 3, wherein a diameter of the through hole is equal to or larger than a diameter of the inspection target.

5. The debris detection apparatus according to claim 1, wherein the optical amplifier or optical filter includes any one of a polarizing plate, a waveplate, or a band pass filter.

6. The debris detection apparatus according to claim 1, wherein the thermal image recorder includes a lens and a focal plane array (FPA) including a sensor array for detecting the infrared signal, and is configured to record a spatial position of the infrared signal.

7. The debris detection apparatus according to claim 1, wherein the inspection target is a battery, and wherein the thermal image recorder configured to distinguish the metal debris on the surface of the battery from the surface of the battery based on the amplified or filtered infrared signal.

8. The debris detection apparatus according to claim 7, wherein the battery comprises a cell encased within an insulator that is disposed on an upper surface of the cell, and wherein the thermal image recorder configured to distinguish the metal debris from the upper surface of the insulator based on the amplified or filtered infrared signal.

9. A debris detection method comprising:
   emitting, by an infrared emitter, far-infrared rays in a band of 7 μm to 14 μm toward an inspection target at a preset incident angle, wherein the infrared emitter is disposed above the inspection target on a central axial line while being spaced apart from the inspection target;
   either one of: (i) amplifying, by an optical unit, an infrared signal reflected from a metal debris existing on a surface of the inspection target, or (ii) filtering, by an optical filter, the infrared signal;
   detecting, by a thermal image recorder, the metal debris on the surface of the inspection target, wherein the optical amplifier or optical filter and the thermal image recorder are sequentially disposed above the infrared emitter on the central axial line while being spaced apart from the infrared emitter; and
   determining, by the thermal image recorder, a size and a position of the metal debris, based on the amplified or filtered infrared signal.

* * * * *